(No Model.) 2 Sheets—Sheet 2.
W. H. REYNOLDS.
FLOUR RECEIVER AND SIFTER.
No. 448,673. Patented Mar. 24, 1891.
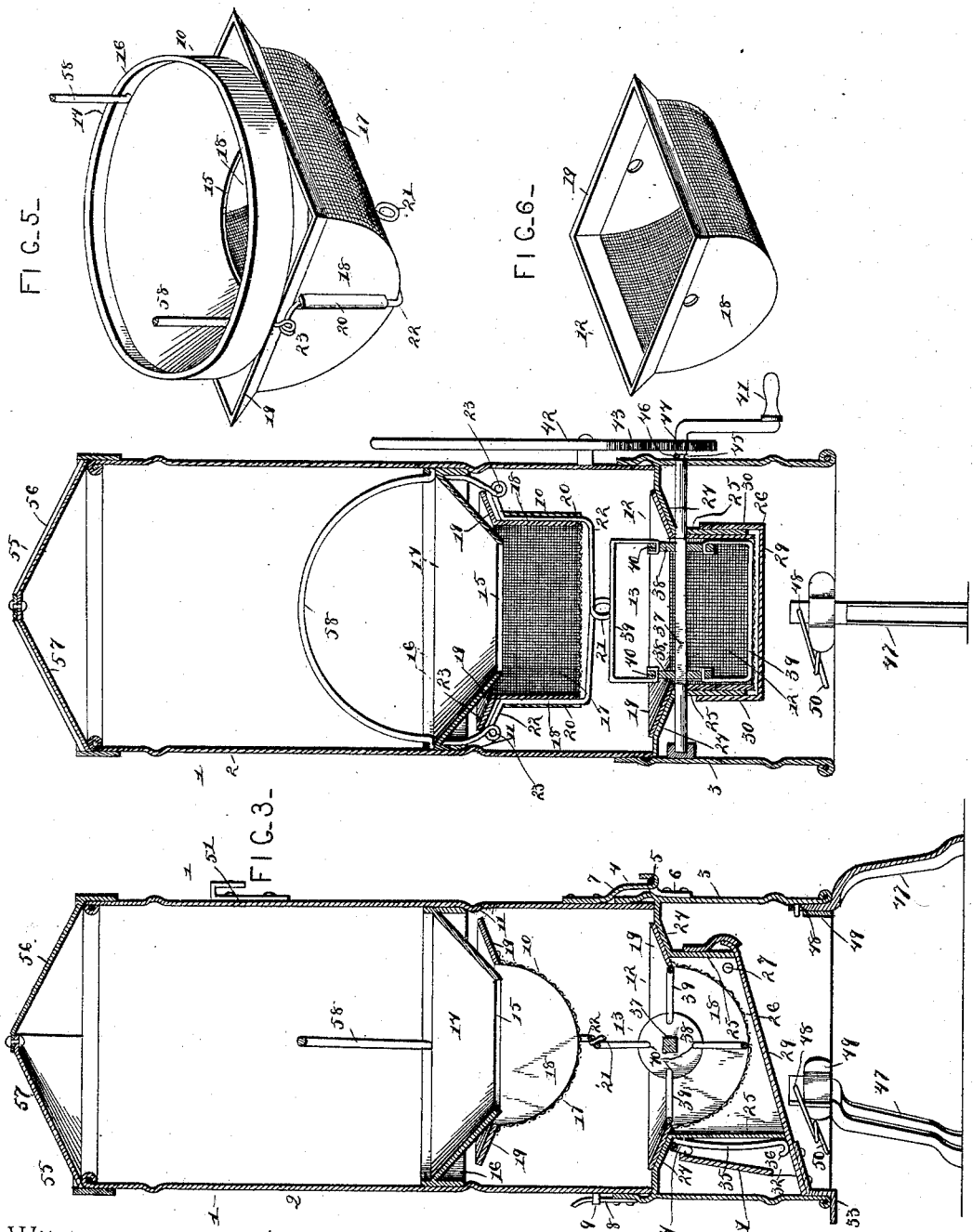
Witnesses
Geo. E. Frech,
H. J. Riley
Inventor
Willie H. Reynolds
By his Attorneys,
C. A. Snow & Co.

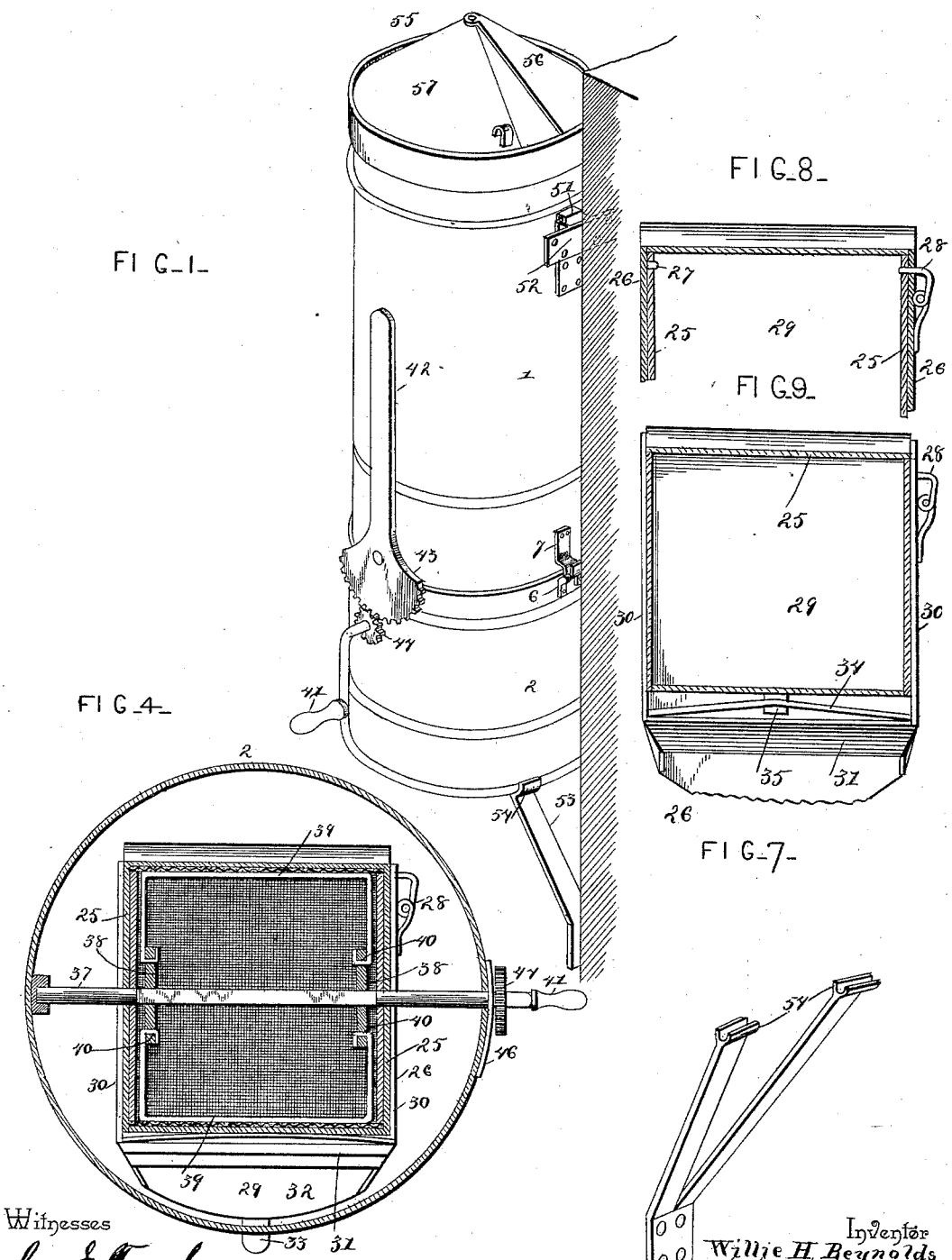

UNITED STATES PATENT OFFICE.

WILLIE HARRISON REYNOLDS, OF RACINE, WISCONSIN.

FLOUR RECEIVER AND SIFTER.

SPECIFICATION forming part of Letters Patent No. 448,673, dated March 24, 1891.

Application filed October 30, 1890. Serial No. 369,849. (No model.)

*To all whom it may concern:*

Be it known that I, WILLIE HARRISON REYNOLDS, a citizen of the United States, residing at Racine, in the county of Racine and State of Wisconsin, have invented a new and useful Flour Receiver and Sifter, of which the following is a specification.

The invention relates to improvements in flour receivers and sifters.

The object of the present invention is to simplify and improve the construction of flour receivers and sifters and provide one adapted to be readily supported on legs or hung on a wall.

A further object of the invention is to provide simple, strong, and durable sifters and agitators and to enable the same to be readily removed for cleaning and similar purposes.

The invention consists in the construction and novel combination and arrangement of parts hereinafter fully described, illustrated in the accompanying drawings, and pointed out in the claims hereto appended.

In the drawings, Figure 1 is a perspective view of a flour receptacle and sifter embodying the invention, illustrating the manner of hanging the same on a wall. Fig. 2 is a central vertical sectional view of the same, the receptacle being supported by legs. Fig. 3 is a similar view taken at right angles to Fig. 2. Fig. 4 is a horizontal sectional view. Fig. 5 is a detail perspective view of the vibrating sieve. Fig. 6 is a similar view of the stationary sieve. Fig. 7 is a detail perspective view of a wall-bracket. Figs. 8 and 9 are detail sectional views.

Referring to the accompanying drawings, 1 designates a flour-receptacle constructed of suitable material, preferably of sheet metal, and being preferably of cylindrical shape, and consisting of upper and lower sections 2 and 3, hinged together at one side by a separable hinge 4, consisting of a pintle 5, having its ends supported by lugs 6, standing from the lower section 3, and a hook or plate 7, secured to the upper section 3, and having an open eye adapted to engage the pintle 5, and the sections are secured together at their opposite sides by a perforated spring-metal plate 8, arranged at the upper edge of the lower section and adapted to engage a pin 9 projecting from the upper section. The upper section is adapted to contain flour, and is provided with a removable sieve 10, supported by a bead 11, formed on the interior of the upper section, and the said sieve 10 is arranged above a stationary sieve 12 of the lower section, and the agitator 13, which acts in conjunction with the lower stationary sieve, is arranged to engage the sieve 10 and agitate the same and cause flour or the like to be sifted. The removable sieve is suspended from a conical hopper 14, having the lower central opening 15, and provided at its upper edges with the vertical circumferential flange or band 16, which rests upon the bead 11, and the sifted portion composed of the curved gauze bottom 17, the semicircular sides 18, and an upper flange 19, preferably formed integral with the sides and providing a flaring mouth, which is arranged beneath the opening 15 and adapted to receive flour falling through the same, and to prevent the escape of the latter other than passing through the meshes of the gauze body. The sieve portion is suspended from the conical hopper by a spring-metal wire 22, having its ends secured between the flange or band 16 and the hopper 14, and passing through sockets 20 of the semicircular sides 18 and under the bottom 17, where it is provided with a centrally-arranged loop 21, which is arranged to be engaged by the agitator to cause a vibratory motion of the sieve. The wire 22 is provided between the hopper and the sieve portion with coils 23, which form springs to cause the sifter to be readily vibrated by the agitator 13.

The stationary sifter 12 is constructed in a manner similar to the sieve 10, and is suspended from a flange 24, extending inward from the lower section, and provided with a rectangular box 25, extending downward around the sieve and having its bottom closed by a hinged spout 26, having one end pivotally connected to box 25 by a rigid journal 27, and a spring-journal 28, adapted to be withdrawn to permit the spout to be removed from the box. The spout consists of a bottom 29 and sides 30 and an end 31, and is provided near the free end of its bottom with an opening 32 to permit the escape of the flour when the spout is lowered, and is provided with a thumb-piece 33 to facilitate operating the spout, and the latter is held in its closed position by a rod 34, secured between the sides 30, and arranged to engage a curved bar 35, secured to one of the sides of the box 25, and provided at its lower end with a hook 36, formed by bending the end of the bar upon itself to provide a stop to limit the downward swing of the spout. The bar 35 is curved throughout its length and presents to the rod a cam surface which holds the sieve closed.

The agitator 13 is mounted upon a shaft 37, which is journaled in the sides of the lower section, and has a portion upon which the agitator is mounted squared to prevent the agitator slipping, and the latter is composed of disks or heads 38, connected by wires 39, which have their ends secured in perforations 40 of the disks or heads. One end of the shaft is provided with a crank-handle 41, by means of which the shaft is operated when a continuous rotation of the agitator is desired; but when a reverse rotary or oscillatory motion is desired the agitator is operated by a lever 42, fulcrumed on the upper section and provided at its lower end with segmental gear 43, which meshes with a pinion 44, mounted upon the shaft. The agitator and stationary sieve may be removed by withdrawing the shaft 37 from its bearings, and in order to retain the shaft in its proper position it is provided with an annular groove 45, which is engaged by a spring 46, having one end secured to the lower section 3. The lower section is supported by legs 47, which are detachably secured to the section and has its upper end provided with a perforation 48 and arranged in socket 49, in which they are secured by spring 50, having one end secured to the inner face of the section and the other end bent at an angle and arranged to engage the perforation 48. The upper section is provided with a hook 51, which is adapted to engage an eye or loop 52, secured to a wall or other suitable supporting surface, and the lower end of the flour-receptacle is supported by a V-shaped bracket 53, having the ends 54 arranged at an angle and provided with a groove to receive the lower edge of the receptacle. The upper section is provided with a removable cover 55, having a stationary section 56, and a movable section 57, pivoted at the center of the cover to the stationary section and adapted to be rotated to form an opening to permit flour to be placed in the receptacle.

The receptacle may be constructed of various materials and in shapes other than that shown; and I desire to be understood that I do not limit myself to the precise details of construction herein shown and described, as I may, without departing from the spirit of my invention, make minor changes therein.

In order to facilitate the removal of the vibrating sieve, which is arranged in the upper section of the casing of the flour-receptacle, a curved wire or handle 58 is provided, and has its ends secured to the conical hopper, and is arranged above the same adapted to be readily grasped by the hand when it is desired to remove the sieve.

It will be readily seen that the various parts of the flour-receptacle and sieve may be readily removed for cleaning or similar purposes.

What I claim is—

1. The combination, with a flour-receiver, of the stationary sieve, the agitator, and the vibrating sieve suspended above the agitator and arranged to be actuated thereby, substantially as described.

2. The combination, with the agitator of a flour receiver and sieve, of a vibrating sieve suspended above the agitator and arranged to be actuated thereby, substantially as described.

3. The combination, in a flour receiver and sieve, of the casing, the agitator mounted therein, a removable conical hopper, and the sieve suspended from the hopper and arranged to be engaged by the agitator, substantially as described.

4. The combination, in a flour receptacle and sieve, of the casing, the removable conical hopper, the sieve suspended from the hopper, and the agitator arranged below the sieve and engaging the same, substantially as described.

5. The combination, in a flour receptacle and sieve, of the casing, the conical hopper provided at its upper edge with the band, the sieve arranged below the hopper and provided at its sides with sockets, the wire arranged in the sockets and passing across the bottom of the sieve and provided below the bottom of the sieve with a loop and having its ends secured to the hopper and provided between the same and the sieve with coils, and the agitator arranged below the sieve and adapted to engage the loop, substantially as described.

6. In a flour receptacle and sieve, the combination of the casing, the conical hopper, the vibrating sieve arranged below and consisting of a curved gauze bottom, the semicircular sides, and the flaring flange arranged at the upper edge of the sieve and formed integral with the sides, and means for vibrating the sieve, substantially as described.

7. In a flour receptacle and sieve, the combination of the casing, the conical hopper provided around its upper edge with a circumferential flange or band, the curved wire having its ends secured to the hopper and being arranged above the same to serve as a handle, the vibrating sieve arranged below and consisting of a curved gauze bottom, the semicircular sides, and the flaring flange arranged at the upper edge of the sieve and formed integral with the sides, and suitable means for vibrating the sieve, substantially as described.

8. In a flour receptacle and sieve, the combination of the casing provided with a flange and having the rectangular box depending therefrom, the stationary sieve supported by the flange, the shaft, the agitator mounted upon the shaft and composed of the disks, the wires connecting the disks and having their ends secured in perforations of the same, and the spout hinged to the box and adapted to close the same, substantially as described.

9. In a flour receptacle and sieve, the combination of the casing, the stationary sieve, the shaft journaled in the casing, the agitator mounted upon the shaft, the rectangular box surrounding the sides of the sieve and provided at one side with a curved bar having at its lower end the stop, and the spout hinged to the box and provided with the rod arranged to engage the curved bar, whereby the spout is held in its closed position, substantially as described.

10. In a flour receptacle and sieve, the combination of the casing, the stationary sieve, the box surrounding the sides of the stationary sieve and provided at one side with the curved bar having at its lower end the hook, and the spout hinged to the box and provided with a rigid journal and the spring-journal and having the rod arranged to engage the curved bar of the box, substantially as described.

11. In a flour receptacle and sieve, the combination of the casing composed of two sections hinged together and provided with the flange, the stationary sieve supported on the flange and adapted to be removed therefrom, the removable shaft journaled in the casing, means for securing the shaft in the bearings, and the agitator removably mounted on the shaft, substantially as described.

In testimony that I claim the foregoing as my own I have hereto affixed my signature in presence of two witnesses.

WILLIE HARRISON REYNOLDS.

Witnesses:
PETER RAETZ,
PETER LUDWIG.